(12) United States Patent  (10) Patent No.: US 7,165,513 B2
Humburg  (45) Date of Patent: Jan. 23, 2007

(54) MULTIWAY VALVE FOR A VEHICLE COOLING/HEATING SYSTEM

(75) Inventor: Michael Humburg, Göppingen (DE)

(73) Assignee: J. Eberspacher GmbH & Co. KG (DE)

( * ) Notice: Subject to any disclaimer, the term of this patent is extended or adjusted under 35 U.S.C. 154(b) by 329 days.

(21) Appl. No.: 10/842,808

(22) Filed: May 11, 2004

(65) Prior Publication Data
US 2004/0238159 A1 Dec. 2, 2004

(30) Foreign Application Priority Data
May 26, 2003 (DE) ............... 103 23 900

(51) Int. Cl.
F01P 7/14 (2006.01)
G05D 23/02 (2006.01)
B60H 1/00 (2006.01)

(52) U.S. Cl. ............... 123/41.08; 236/93 R; 165/41; 137/887

(58) Field of Classification Search ........... 236/93 R, 236/93 A; 165/41; 123/41.08, 41.2, 41.1, 123/41.12; 237/8 A, 12.3; 137/887, 861, 137/597
See application file for complete search history.

(56) References Cited
U.S. PATENT DOCUMENTS
2,277,814 A * 3/1942 Booth ............... 237/2 A

FOREIGN PATENT DOCUMENTS

| DE | 198 16 522 | 10/1999 |
|---|---|---|
| DE | 198 16 522 A | 10/1999 |
| DE | 100 42 496 | 3/2002 |
| DE | 101 55 386 | 5/2003 |
| DE | 10155386 A1 * | 5/2003 |
| FR | 2 276 957 A | 1/1976 |

* cited by examiner

Primary Examiner—Chen Wen Jiang
(74) Attorney, Agent, or Firm—McGlew & Tuttle, PC (57) ABSTRACT

A multiway valve has a valve housing arrangement (2, 34), in which a valve chamber (8) is formed, at least three main valve connections (3, 4, 5, 6) leading to the valve chamber (8), and a main valve member. The main valve member (1) can be brought into a plurality of valve member positions to interrupt and release the connection between the main valve connections (3, 4, 5, 6) and the valve chamber (8) as desired. At least two of the main valve connections (3, 4, 5, 6) are in connection with the valve chamber (8) in each valve member position of the main valve member (1). At least one auxiliary valve connection (32) leading to the valve chamber (8) and by an auxiliary valve member (28), which is associated with the auxiliary valve connection (32) and is adjustable for interrupting and releasing the connection between the auxiliary valve connection (32) and the valve chamber (8).

7 Claims, 6 Drawing Sheets

MULTIWAY VALVE FOR A VEHICLE COOLING/HEATING SYSTEM

CROSS REFERENCE TO RELATED APPLICATIONS

This application claims the benefit of priority under 35 U.S.C. § 119 of German patent application DE 103 23 900.6 filed May 26, 2004 the entire contents of which are incorporated herein by reference.

FIELD OF THE INVENTION

The present invention pertains to a multiway valve, comprising a valve housing arrangement, in which a valve chamber is formed, at least three main valve connections leading to the valve chamber, and a main valve member, which can be brought into a plurality of valve member positions for interrupting and releasing the connection of the main valve connections with the valve chamber as desired, wherein at least two of the main valve connections are in connection with the valve chamber in each valve member position of the main valve member.

BACKGROUND OF THE INVENTION

Such a multiway valve is known, for example, from DE 198 16 522 A1. This prior-art valve is shown in FIGS. 1 through 4 (FIGS. 1.1 to 4.4) in respect to its general design and its mode of operation and will be described below in reference to these figures.

It is recognized especially from FIGS. 2.1 to 2.4 that this prior-art multiway valve has a valve body, which is generally designated by 2, has a pot-shaped or cylinder-like valve body and in which a valve chamber 8 is formed. Four valve connections 3, 4, 5 and 6 provided in the form of connecting pieces, openings or the like open into the cylindrical circumferential wall of the valve body 2 and are thus, in principle, in connection with the valve chamber 8. It is recognized that the four valve connections 3, 4, 5, 6 are arranged such that they are located opposite each other in pairs, so that the valve connections 3, 4 are located opposite each other in a first plane, which is the upper plane in FIG. 2, with an angular distance of 180° relative to the longitudinal axis of the valve body, while the two valve connections 5 and 6 are located opposite each other with an angular distance of 180° in a second plane, which is the lower plane, and provisions may be made, for example, for the valve connection 5 to be located directly under the valve connection 3 of the other pair of valve connections, while the valve connection 6 is located directly under the valve connection 4 of the other pair of valve connections.

A valve member 1 of an essentially cylindrical or even regular cylindrical design, which is adapted to the contour of the valve body 12, is provided in the valve body 12. This valve member can be driven in the area of a drive shaft 7 by a drive motor, not shown, for rotation around the axis A. Associated with each pair of valve connections 3 and 4 as well as 5 and 6, the valve member 1 has respective openings 10, 11, 12 and 13, 14, 15. These two groups of openings 10, 11, 12 and 13, 14, 15 are, just as the two pairs of valve connections 3,4 and 5,6, provided in the two planes already referred to above, so that the connection of the different valve connections 3, 4, 5, 6 with the valve chamber 8 can be interrupted, released or partially released by means of the openings 10, 11, 12, 13, 14, 15 by rotating the valve member 1. It is also recognized above all in FIGS. 3.1 to 3.4 and 4.1 to 4.4 that one opening with a larger circumferential extension is provided in each group of openings 10, 11, 12 and 13, 14, 15, namely, the openings 10 and 13, while two openings with a smaller circumferential extension are provided, namely, the openings 11, 12 and 14, 15. The circumferential extensions are selected to be such that when the valve member 1 is brought into one of several main valve positions, which main valve positions can be reached by rotating the valve member by 45° from a preceding main valve position, the openings 11, 12 and 14, 15 provided with a smaller circumferential extension are completely aligned or completely unaligned, and the openings 10 and 13 provided with a longer circumferential extension are aligned with one of the valve connections 3, 4 or 5, 6 in two directly adjacent main valve positions and thus release that valve connection.

The mode of operation for attaining the different main valve positions will be described below. It shall be assumed at first that the opening 10 releases the valve connection 3 in a first main valve position shown in section a) in the far left parts of FIGS. 1 through 4, while the opening 11 releases the valve connection 4. Since the openings 13, 14, 15 have basically the same relative arrangement as the openings 10, 11 and 12, but are rotated in relation to the latter by 45°, none of the openings 13, 14, 15 is aligned in this first main valve position with one of the valve connections 5, 6, so that, as can be recognized in FIG. 2, a flow connection is established only between the valve connection 3 and the valve connection 4 via the valve chamber 8. If the valve member 1 is rotated by 45° starting from the main valve position shown in FIG. 1, namely, in the counterclockwise direction in the view, the opening 10 with the longer circumferential extension continues to be aligned with the valve connection 3, whereas none of the openings 11 and 12 is aligned with the valve connection 4. The opening 15 in the lower group of openings is now aligned with the valve connection 6, whereas the valve connection 5 is not aligned with any of the openings of this group. Thus, there is a connection between the valve connection 3 and the valve connection 6 via the valve chamber 8.

If the valve member 1 is rotated farther by 45° into a third main valve position, the opening 10 with the longer circumferential extension of the upper group of openings is moved out of alignment with the valve connection 3, whereas the opening 12 releases the connection between the valve connection 4 and the valve chamber 8. The opening 13 with the longer circumferential extension in the lower group of openings is now aligned with the valve connection 5, whereas the valve connection 6 is not aligned with any opening. The line connection between the valve connection 4 and the valve connection 5 is then established via the valve chamber 8. If the valve member 1 is rotated farther by 45°, a fourth main valve position is reached. The openings 13 of the lower group of openings continue to be aligned with the valve connection 5 in this position. The valve connection 6 is now aligned with the opening 14, so that the two valve connections 6 and 5 are now in connection with one another via the valve chamber 8. None of the openings of the lower group is now aligned with one of the valve connections 3 or 4, so that the state recognizable in the far right-hand part of FIG. 2 has been reached.

If the valve member 1 were rotated farther by another 45° starting from this fourth main value position shown in section d) in the far right-hand parts of FIGS. 1.1 through 4.4, a state that corresponds to the first main valve position would again be reached because of the exiting symmetry, but the valve member 1 would now have been rotated by 180° in relation to the first main valve position.

The above description shows that the presetting of four main valve positions is essentially also due to the fact that the different groups of openings and the particular circumferential distance or the circumferential extension of these openings are provided in a defined manner. It is self-explanatory that there are intermediate valve positions between these four main valve positions, in which the different openings 10, 11, 12, 13, 14, 15 are not completely aligned with the respective valve connections or are not aligned, but there is only a partial alignment, so that additional flow paths are released, while other flow paths are throttled by reducing the flow cross section. If, for example, an intermediate valve position located between the main valve positions 1 and 2 is reached, the valve connections 3 and 4 are still in connection, but the opening 11 is aligned only partially or by half with the valve connection 4. However, the opening 15 is now partially aligned at the same time with the valve connection 6, so that there is a connection between the valve connections 3, 4 and 6 via the valve chamber 8 in this intermediate state. If an intermediate valve position located between the second and third main valve positions is reached, a connection is now established between the valve connections 3 and 4, on the one hand, and the valve chamber 8, on the other hand, via the openings 10 and 12, whereas the valve connections 5 and 6 are also in connection with the valve chamber 8 via the openings 13 and 15. Thus, a state emerges in which all of the valve connections 3, 4, 5, 6 communicate with one another via the valve chamber 8. If the valve member is brought into an intermediate position between the main valve positions 3 and 4, the valve connection 3 continues to be closed, while the valve connection 6 is now additionally connected via the opening 14 and the valve connections 4, 5 and 6 are thus in connection with one another via the valve chamber 8.

It is recognized from this that when a particular intermediate valve position is assumed, the valve connections now released for the fluid communication are formed by the sum of the valve connections released in the main valve positions located on both sides of the intermediate valve position. By approaching the valve member 1 to one of the main valve positions or by moving it away from the other of the main valve positions, it can be achieved that the valve connections that are released, in principle, in one valve position are released with a larger cross section, while the valve connections released in the main valve position that is located farther away will be throttled more strongly. A defined flow guiding can thus be achieved by generating throttling effects in a defined manner even when more than two valve connections are released.

However, it is of significance that no valve position can be assumed in which at least two of the valve connections do not communicate with one another in order to thus allow a defined fluid flow via this multiway valve.

This type of multiway valve is used, in particular, in vehicle heating/cooling systems in which the coolant circulation of the drive assembly, generally an internal combustion engine, is to be guided, as desired, such that, e.g., the cooling medium circulates only through the drive assembly during a cold start phase and cannot come into contact with any heat exchanger arrangement; that it can circulate between the drive assembly and a heat exchanger arrangement, e.g., a cooler, at a comparatively high cooling medium temperature; that an additional heat exchanger arrangement, e.g., a heating heat exchanger, can be connected into the fluid circulation as an alternative or in addition to the connection of the cooler at a comparatively high cooling medium temperature and when heating is needed in the vehicle, or that a fluid circulation is established between the drive assembly and the heating heat exchanger during the start phase, i.e., in case of a comparatively cold cooling medium and when heating is needed in the vehicle, while the cooler is uncoupled from this circulation.

A problem may arise in such a valve when it develops a defect in one of its valve positions and cannot be adjusted any longer. Particularly critical in this connection is the state in which the multiway valve is connected such that a circulation takes place only through the drive assembly in order to bring the cooling medium or the drive assembly to the desired operating temperature as quickly as possible. If the valve cannot be switched over after the end this start phase, there is a risk for overheating of the cooling medium and the drive assembly.

SUMMARY OF THE INVENTION

The object of the present invention is therefore to improve a multiway valve of this type such that increased safety can be achieved in case of or against a valve defect.

This object is accomplished according to the present invention by a multiway valve comprising a valve housing arrangement, in which a valve chamber is formed, at least three main valve connections leading to the valve chamber, and a main valve member, which can be brought into a plurality of valve member positions for interrupting and releasing the connection of the main valve connections with the valve chamber as desired, wherein at least two of the main valve connections are in connection with the valve chamber in each valve member position of the main valve member, which said valve is characterized, furthermore, by at least one auxiliary valve connection leading to the valve chamber and an auxiliary valve member that is associated with the said auxiliary valve connection and is adjustable for interrupting and releasing the connection between the auxiliary valve connection and the valve chamber.

It becomes possible due to the provision of an auxiliary valve connection to additionally establish a circulation in states that are critical for safety or to open an additional flow path, e.g., in order to thus cool the fluid circulating therein, so that provisions may be made, according to another aspect of the present invention, for the auxiliary valve member to be adjustable as a function of a temperature in the area of the valve chamber between an interruption position and a release position. For this, it is possible, for example, for the auxiliary valve member to have an adjusting element, which adjusts the auxiliary valve member between the interruption position and the release position by a thermally induced change in its dimensions.

It is proposed, for example, for passing over into the normal operation after the end of a state that is critical for safety, that the adjusting element adjust the auxiliary valve member in the direction of the release position against the action of a force pretensioning the auxiliary valve member in the direction of the interruption position.

According to another advantageous aspect, provisions may be made for making the connection between at least one of the main valve connections and the valve chamber variable by adjusting the auxiliary valve member between the interruption position and the release position.

It is advantageous, especially in case of the use of a multiway valve according to the present invention in a cooling/heating system of a motor vehicle, for this valve to have four main valve connections.

The present invention pertains, furthermore, to a vehicle cooling/heating system, comprising:

a multiway valve according to the present invention;

a first fluid line, which provides for a connection between a first main valve connection and a first heat exchanger arrangement;

a second fluid line, which provides for a connection between a second main valve connection and the first heat exchanger arrangement;

a third fluid line, which provides for a connection between a third main valve connection and a second heat exchanger arrangement;

a fourth fluid line, which provides for a connection between a fourth main valve connection and the second heat exchanger arrangement;

a fifth fluid line, which provides for a connection between the first main valve connection or the second main valve connection and a drive assembly;

a sixth fluid line, which provides for a connection between the third main valve connection or the fourth main valve connection and the drive assembly; and a seventh fluid line, which provides for a connection between the auxiliary valve connection and a fluid line from among the first fluid line, the second fluid line, the third fluid line and the fourth fluid line.

To make it possible to ensure the above-mentioned safety in this system by the forced cooling of the fluid in case of overheating, it is proposed, furthermore, that regardless of the valve member position of the main valve member, a fluid exchange connection be provided between the drive assembly and one of the heat exchanger arrangements when the interruption of the connection between the auxiliary valve connection and the valve chamber is eliminated.

According to another aspect, provisions may be made in the system according to the present invention for the second heat exchanger arrangement to have a vehicle heater heat exchanger; for a heater for heating the fluid flowing in the third fluid line or in the fourth fluid line to be associated with the third fluid line or the fourth fluid line, and for a valve arrangement to be provided, by which the third fluid line and the fourth fluid line can be uncoupled from the third main valve connection and from the fourth main valve connection as desired in order to generate a fluid circulation between the second heat exchanger arrangement and the heater, or the third fluid line and the fourth fluid line can be uncoupled for connecting the second heat exchanger arrangement to a third main valve connection and to the fourth main valve connection.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 1.1 is a schematic perspective view a) of a valve member of a prior-art 4/4-way valve in a first main valve position, associated with four valve connections;

FIG. 1.2 is a schematic perspective view b) of a valve member of a prior-art 4/4-way valve in a second main valve position, associated with four valve connections;

FIG. 1.3 is a schematic perspective view c) of a valve member of a prior-art 4/4-way valve in a third main valve position, associated with four valve connections;

FIG. 1.4 is a schematic perspective view d) of a valve member of a prior-art 4/4-way valve in a fourth main valve position, associated with four valve connections;

FIG. 2.1 is a sectional view a) along a line II—II in FIG. 1.1 of a 4/4-way valve according to the state of the art, which is schematically indicated in FIG. 1, in the one of the four main valve positions;

FIG. 2.2 is a sectional view b) along a line II—II in FIG. 1.2 of a 4/4-way valve according to the state of the art, which is schematically indicated in FIG. 1, in the one of the four main valve positions;

FIG. 2.3 is a sectional view c) along a line II—II in FIG. 1.3 of a 4/4-way valve according to the state of the art, which is schematically indicated in FIG. 1, in the one of the four main valve positions;

FIG. 2.4 is a sectional view d) along a line II—II in FIG. 1.4 of a 4/4-way valve according to the state of the art, which is schematically indicated in FIG. 1, in the one of the four main valve positions;

FIG. 3.1 is a sectional view along a line III—III in FIG. 2.1 of the 4/4-way valve according to FIG. 2.1 in one of the different main valve positions;

FIG. 3.2 is a sectional view along a line III—III in FIG. 2.2 of the 4/4-way valve according to FIG. 2.2 in one of the different main valve positions;

FIG. 3.3 is a sectional view along a line III—III in FIG. 2.3 of the 4/4-way valve according to FIG. 2.3 in one of the different main valve positions;

FIG. 3.4 is a sectional view along a line III—III in FIG. 2.4 of the 4/4-way valve according to FIG. 2.4 in one of the different main valve positions;

FIG. 4.1 is sectional view along a line IV—IV in FIG. 2.1 of the 4/4-way valve according to FIG. 2.1 in one of the different main valve positions;

FIG. 4.2 is sectional view along a line IV—IV in FIG. 2.2 of the 4/4-way valve according to FIG. 2.2 in one of the different main valve positions;

FIG. 4.3 is sectional view along a line IV—IV in FIG. 2.3 of the 4/4-way valve according to FIG. 2.3 in one of the different main valve positions;

FIG. 4.4 is sectional view along a line IV—IV in FIG. 2.4 of the 4/4-way valve according to FIG. 2.4 in one of the different main valve positions;

FIG. 11 is a schematic view of a modified system corresponding to FIG. 6.

DESCRIPTION OF THE PREFERRED EMBODIMENT

The basic design of a multiway valve 36 according to the present invention will first be described in reference to FIG. 5. This multiway valve 36 is designed, in principle, or in essential areas as the multiway valve known from DE 198 16 522 A1, which was described in detail above in reference to FIGS. 1 through 4. Consequently, reference is made to the above explanations and also to the disclosure content of DE 198 16 522 A1 insofar as there is agreement.

Figure 1:
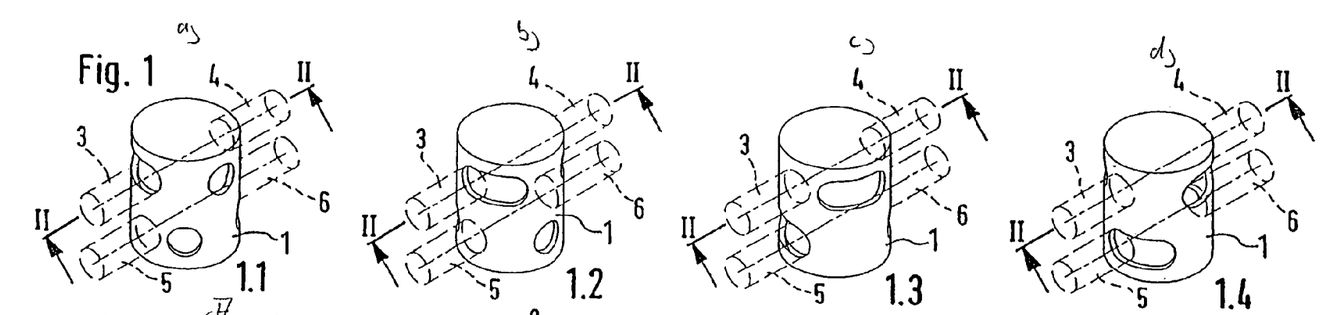
Figure 2:
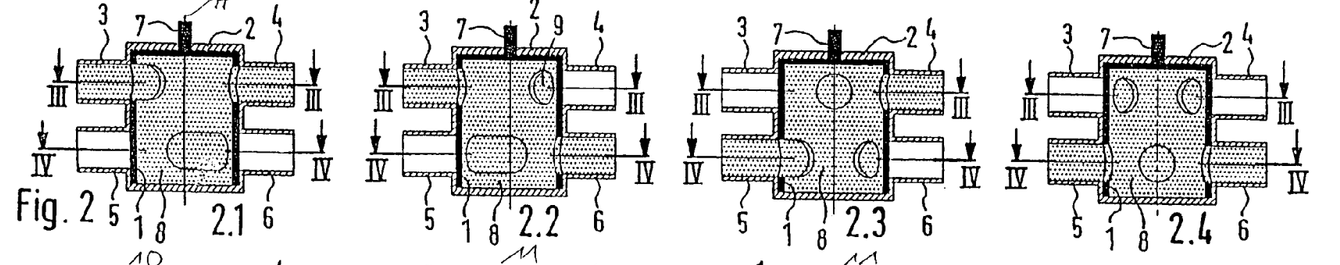
Figure 3:
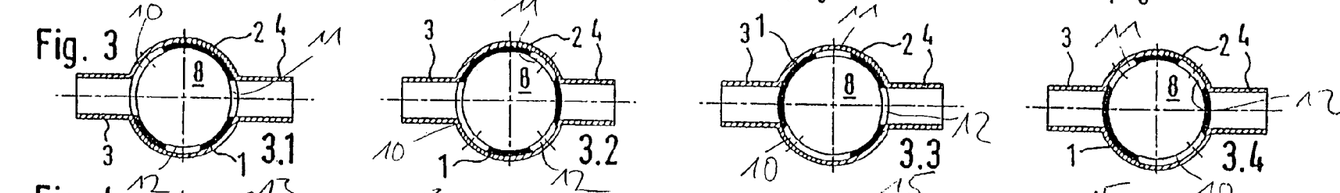
Figure 4:
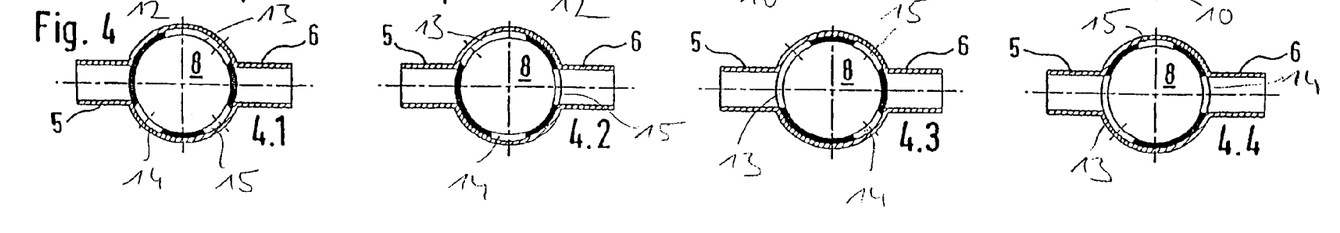
Figure 5:
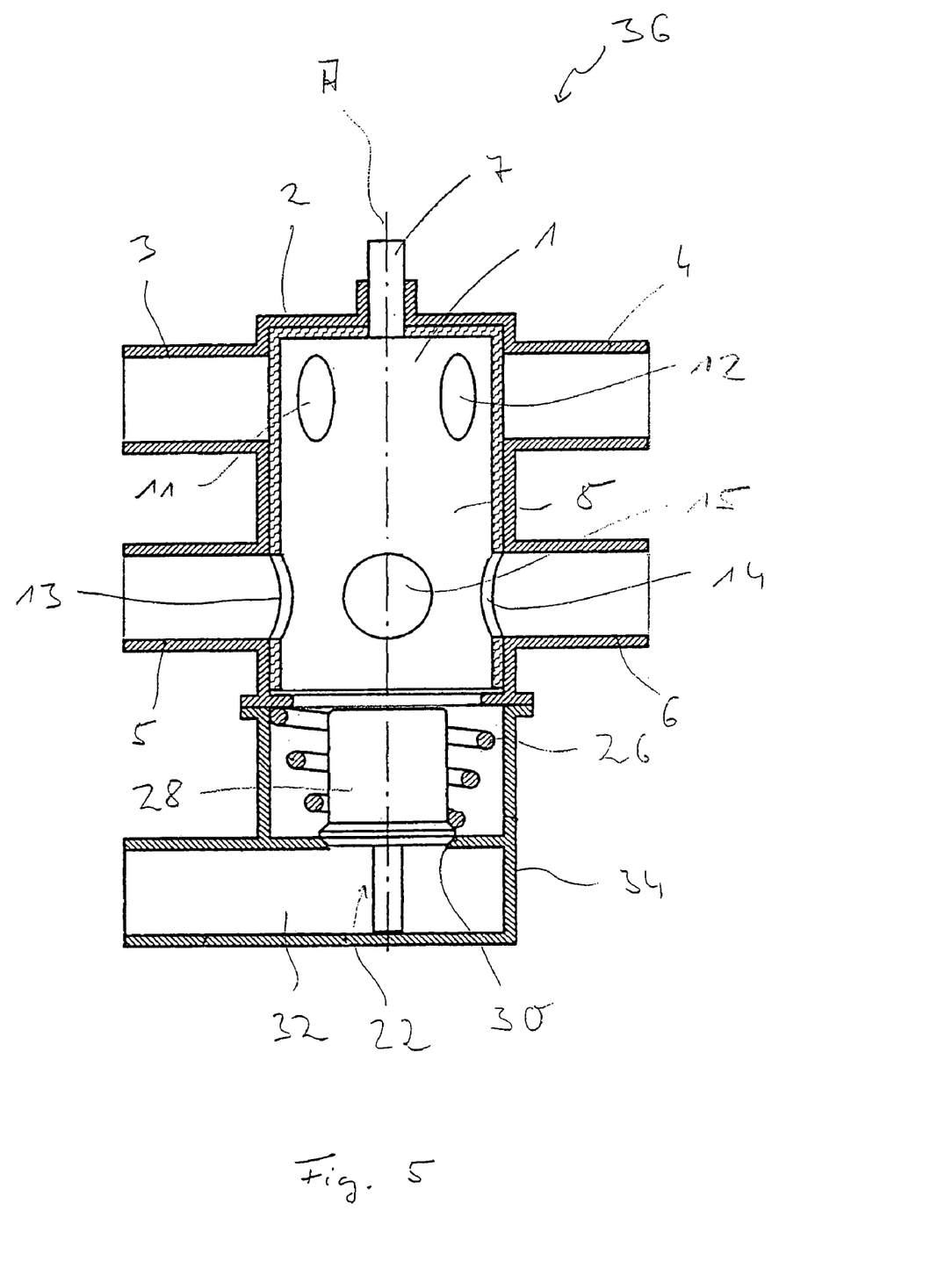
FIG. 5 is a longitudinal sectional view of a multiway valve designed according to the present invention.

FIG. 5 also shows the cylindrical or regular cylindrical valve body 2, into which the valve openings 3, 4, 5 and 6, which now form so-called main valve openings, open, always in pairs (3 and 4 as well as 5 and 6), located opposite each other in two planes offset in the direction of the longitudinal axis of the valve body 2. The valve member 1 provided with the contour or shape corresponding to the outer circumferential wall of the valve body 2 is likewise provided as the main valve organ in the valve body 2. Via the pin or the shaft 7, this valve member 1 can be driven by a drive motor 38 recognizable, e.g., in FIG. 6, for example, a stepping motor, actuated by a control device 40, for rotation around the axis A, in order to reach the above-described valve positions, i.e., especially the main valve positions shown in the views a), b), c) and d) in FIGS. 1.1 through 4.4 and, of course, also all intermediate valve positions located in between. Thus, the same conditions as those described above will arise concerning the flow connection between the main valve connections 3, 4, 5 and 6.

However, it is recognized in FIG. 5 that the valve body 2 is open on one side, the side located opposite the drive connection of the main valve member 1 in the view, and is connected with another valve housing 34 there. An auxiliary valve opening 32, which is also in connection or can also be brought into connection, in principle, with the valve chamber 8, also leads to or is provided in this valve housing 34. A valve opening 30, on which an auxiliary valve member 28 is seated, pretensioned by a pretensioning spring 26, is provided for this purpose in the housing 34. Consequently, the connection between the auxiliary valve connection 32 and the valve chamber 8 is closed by the auxiliary valve member 28 pretensioned into its closed position in the state being shown in FIG. 5. It shall be pointed out here that the pretensioning spring 26 may be supported, for example, at a flange area of the valve body 2, which is formed in the area in which the valve body 2 is connected with the housing 34.

An adjusting element 22, which is supported at the auxiliary valve member 28, on the one hand, and at the housing 34, on the other hand, is associated with the auxiliary valve member 28. This adjusting element, which may also be supported on a bottom area of the pot-shaped auxiliary valve member 28, contains a piston/piston rod element, which is supported at a pot-shaped bottom area of the auxiliary valve member 28 via the intermediary of a material with a comparatively high coefficient of thermal expansion, for example, wax, and is supported at the other end at the housing 34, as can be recognized from FIG. 5. If this adjusting element 22 is heated, it expands and presses the auxiliary valve member 28 against the pretensioning action of the spring 26, so that if the pressing action is sufficient, the valve member 28 releases or partially releases the opening 30, depending on the extent of the heating and the expansion of the adjusting element 22.

It is recognized from the above description that the state of setting of the auxiliary valve member 28 depends on the temperature that prevails in the area of the multiway valve 36, especially in the area of the valve chamber 8 of that valve. If the temperature rises or is higher in this area, which temperature is also predetermined by the temperature of the fluid or cooling medium flowing through the valve chamber 8 and is present there, the auxiliary valve member 28 opens and thus establishes a connection between the auxiliary valve connection 32 and the valve chamber 8. As will be described below, this characteristic can be used to release or interrupt an additional flow path depending on the temperature in order to thus provide for an increased safety of the operation of a cooling/heating system equipped with such a multiway valve, for example, in a motor vehicle. This will be described below especially in reference to FIGS. 6 through 10, which show different operating states of a cooling/heating system equipped with the multiway valve 36 shown in FIG. 5.

Figure 6:
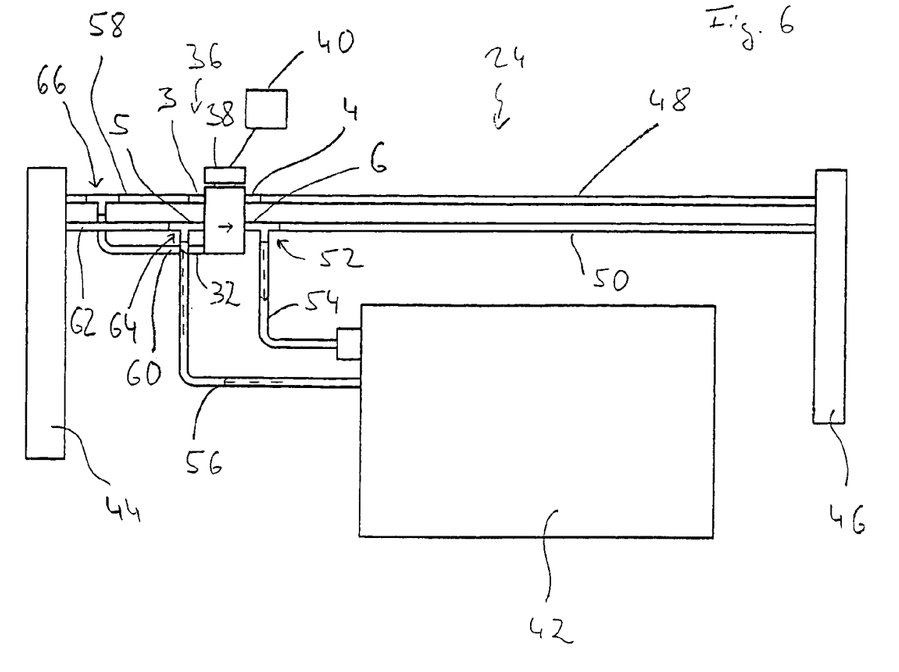
FIG. 6 is a schematic view of a vehicle cooling/heating system, in which a multiway valve according to the present invention is provided, in which a cooling medium circulates only through a drive assembly.
Figure 7:
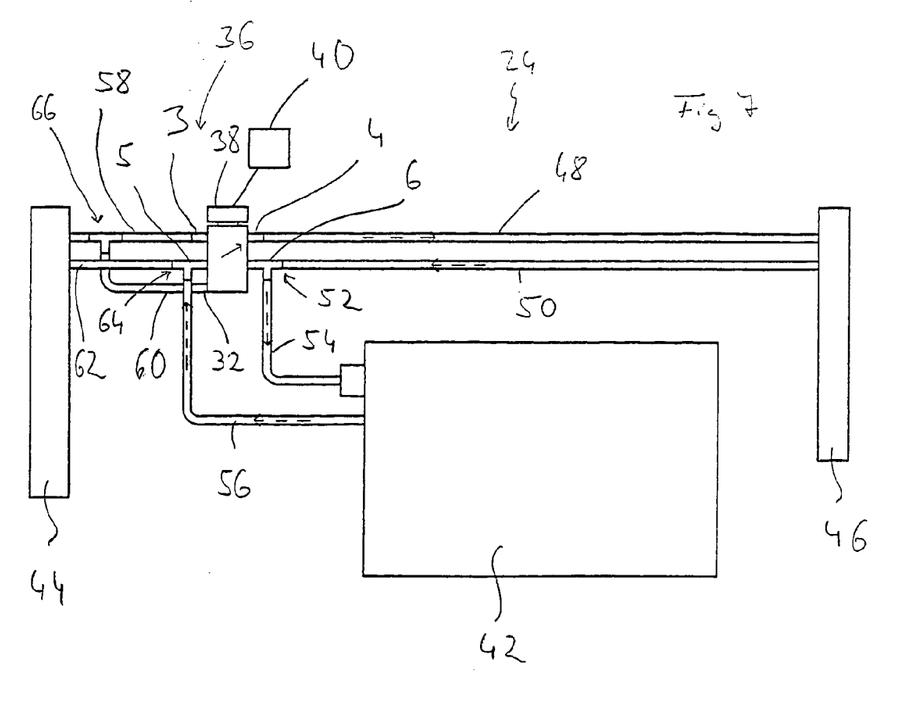
FIG. 7 is a schematic view of the system according to FIG. 6 in an operating state in which a cooling medium circulates through the drive assembly and a heating heat exchanger.

The cooling/heating system 24 shown in FIG. 6 has as an essential system area a drive assembly designated by 42, which is designed, for example, as an internal combustion engine. Furthermore, a cooling heat exchanger 44 and a heating heat exchanger 46 are provided. The circulating medium, for example, water, can release heat to the environment in the cooling heat exchanger 44. Heat can be transferred in the heating heat exchanger 46 to the air to be introduced into the interior space of a vehicle. A line 48 is provided between the main valve connection 4 and the heating heat exchanger 46. A line 50, from which a line 54 branches off to the drive assembly 42 in the area of a branch 52, is likewise provided between the main valve connection 6 and the heating heat exchanger 46. The drive assembly 42 is thus also in connection with the main valve connection 6.

A line 58 is provided between the main valve connection 3 and the cooling heat exchanger 44, and a line 62 is likewise provided between the main valve connection 5 and the cooling heat exchanger 44. A line 56 branches off from this line 62 to the drive assembly 42, so that this line is also in connection with the main valve connection 5. Furthermore, the auxiliary valve connection 32 is in connection with the line 58 through a branch 66 and a line 60, and thus also with the main valve connection 3 and the cooling heat exchanger 44.

It shall now be assumed that the system according to FIG. 6 is in a cold start state, in which the drive assembly as well as the circulating cooling medium consequently still have a temperature far below the desired operating temperature shortly after the start of the drive assembly. The multiway valve 36 is now brought into the fourth main valve position shown in FIGS. 1 through 4d), in which the two main valve connections 5 and 6 are in connection with one another. Since the cooling medium has a comparatively low temperature, the auxiliary valve member 28 will shut off the auxiliary valve connection 32, so that, as is indicated by the arrows drawn in dash-dotted line, the cooling medium can circulate through the drive assembly 42 via the lines 56 and 54 and the main valve connections 5 and 6, and, of course, a corresponding circulating pump may be provided here, for example, in the area of the drive assembly 42.

Once the system 24 has been sufficiently heated, or if it is additionally also necessary to heat air in the heating heat exchanger 46 for feeding it into the interior space of the vehicle, the multiway valve 36 is now brought into the third main valve position, in which there is a connection between the main valve connections 5 and 4.

Figure 8:
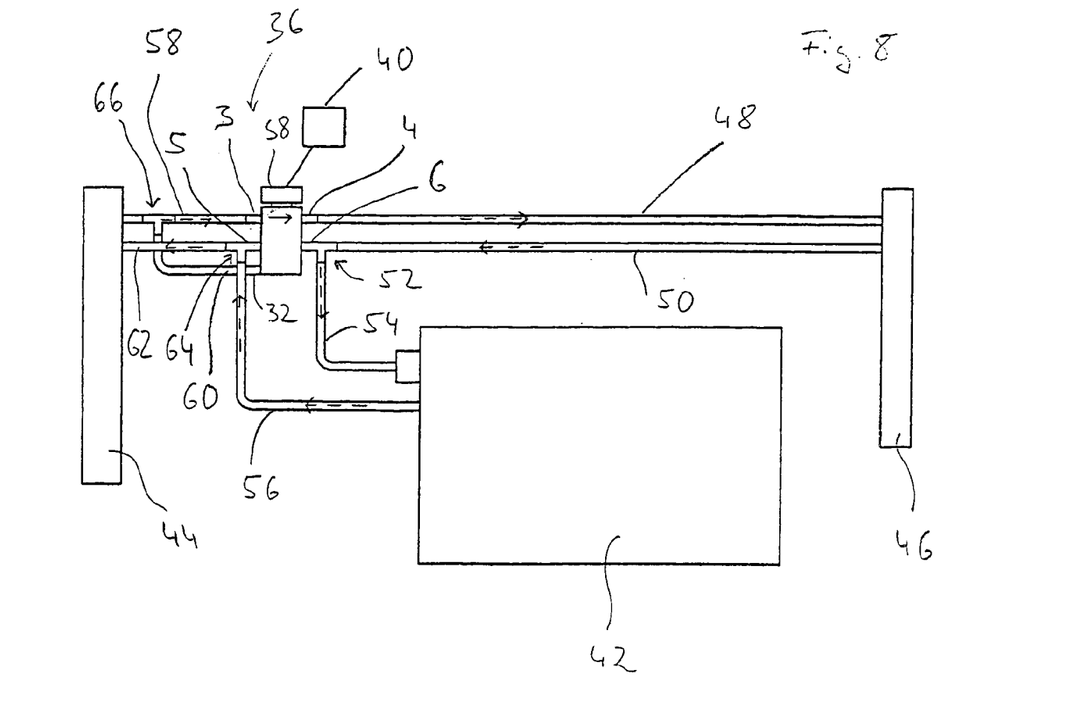
FIG. 8 is a schematic view of the system according to FIG. 8 in an operating state in which the cooling medium circulates through the drive assembly, the heating heat exchanger and a cooling heat exchanger.

If, after further heating of the cooling medium, the latter shall now additionally also be cooled in the area of the cooling heat exchanger 44, the multiway valve 36 is brought into a state in which the flow connection between the main valve connections 5 and 6 is interrupted, while a connection between the main valve connections 3 and 4 is present. The views in FIGS. 1 through 4 show that this is the first main valve position shown in section a) (FIG. 8).

Figure 9:
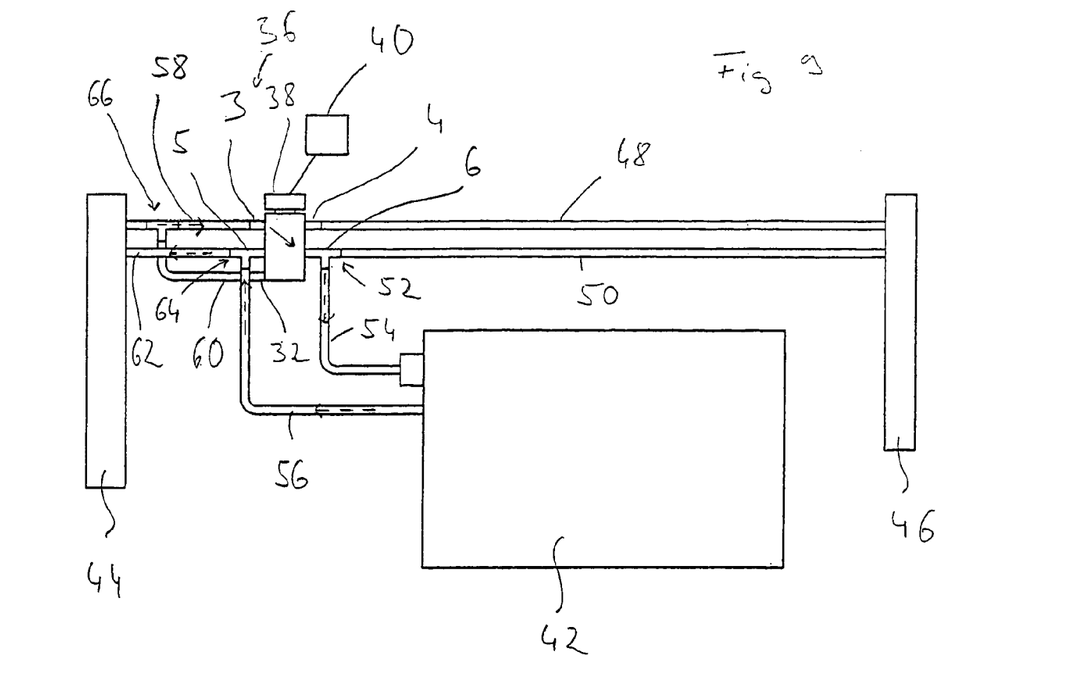
FIG. 9 a schematic view of the system according to FIG. 6 in an operating state in which the cooling medium circulates through the drive assembly and the cooling heat exchanger.

If the cooling medium shall not flow to the heating heat exchanger 46, but only to the cooling heat exchanger 44, the multiway valve 36 is now brought into the second main valve position shown in section b) of FIGS. 1 through 4, in which there is a connection between the main valve connections 3 and 6, while the main valve connections 5 and 4 are not in connection with the valve chamber 8. The heating medium will then flow via the lines 56 and 62 to the cooling heat exchanger 44 and from this via the line 58 to the main valve connection 3, the valve chamber 8, the main valve connection 6 and back to the drive assembly 42 via the line 54 (FIG. 9).

The different states occurring during the normal operation, which are obtained by bringing the multiway valve 36 into one of its main valve positions, were described above. It is ensured by a corresponding release of heat in all these states during normal operation that the cooling medium will not exceed a certain maximum temperature. It is self-explanatory that the fluid circulation can take place in the above-described states not only in the direction shown in the figures. Flow is, of course, also possible in the opposite direction.

Figure 10:
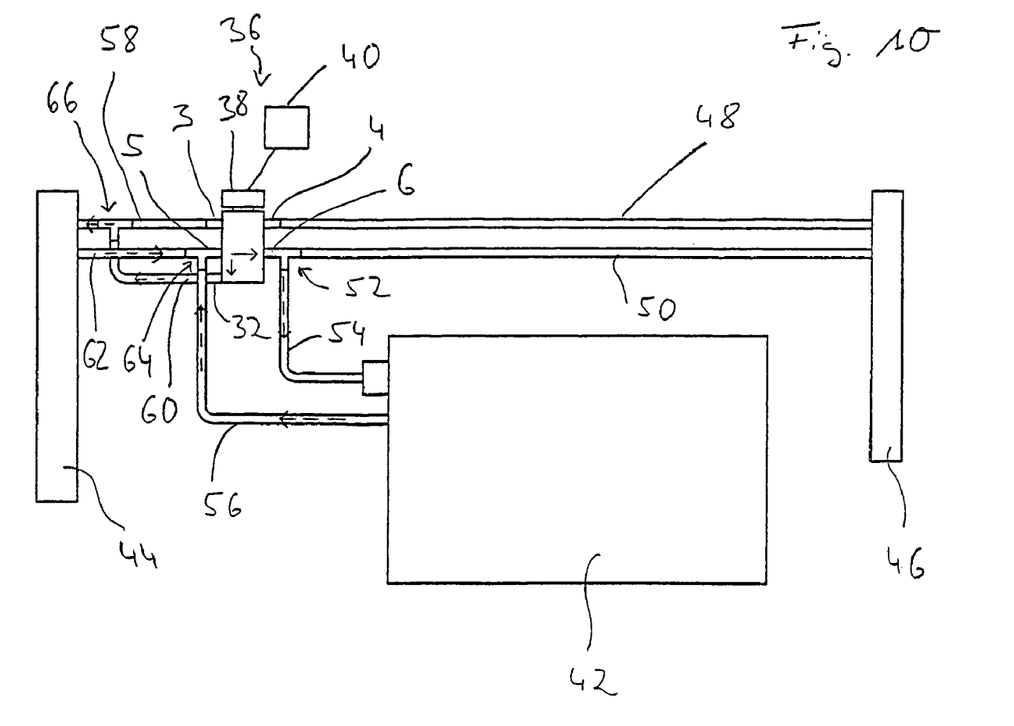
FIG. 10 is a schematic view of the system according to FIG. 6 in a state of error of the multiway valve.

If a defect develops in the system 24 especially in the area of the multiway valve 36, which causes that the multiway valve cannot be actuated or adjusted in a suitable manner, there is, in principle, a risk of overheating due the fact that it is no longer possible to release heat from the cooling medium. Such a defect would be especially critical in the operating state shown in FIG. 6, because, due to the fact that no heat exchanger is integrated in the circulation here at all, there is practically no possibility of releasing heat from the cooling medium. This state of error is shown as an example in FIG. 10. A fluid circulation is provided first via the lines 56 and 54 and the main valve connections 5 and 6 in order to heat, for example, the cooling medium as rapidly as possible. If a switchover is then to be performed after sufficient heating, and this is not possible because of a defect, e.g., in the area of the multiway valve 36, the temperature of the cooling medium will rise increasingly during its continued circulation through the lines 56 and 54, which will also lead to a temperature rise in the area of the valve chamber 8 and in the area of the entire multiway valve 36. However, the temperature of the adjusting element 22 described above in reference to FIG. 5 will rise as well. In case of a sufficiently intense heating, this adjusting element 22 will then displace the auxiliary valve member 28 against the pretensioning action of the pretensioning spring 26, so that the opening 30 will be released at least partially and the connection will be established between the valve chamber 8 and the auxiliary valve connection 32. As is indicated in FIG. 10, there also is now a connection between the main valve opening 5 and the auxiliary valve opening 32 via the valve chamber 8, so that a circulation section is additionally released via the line 60, the line 58 beginning from the branch 66, the cooling heat exchanger 44 and the line 62, and this circulation section makes possible the flow through the cooling heat exchanger 44. Thus, there is generally a circulation connection between the drive assembly 42 and the cooling heat exchanger 44, so that at least part of the cooling medium leaving the drive assembly 42 via the line 56 circulates through the cooling heat exchanger 44 and is thus cooled. This portion can be further increased with rising temperature due to the fact that the adjusting element 22 moves the auxiliary valve member 28 farther away from the opening 30 due to the further expansion, which is also taking place now, and the throttling action generated by the auxiliary valve member 28 is further reduced. If the cooling medium is again being cooled sufficiently due to the cooling heat exchanger 44 being thus included in the circulation, the adjusting element 22 will also cool and contract, as a consequence of which the auxiliary valve connection 32 can, e.g., again be completely uncoupled from the valve chamber 8.

Due to the fact that the auxiliary valve connection 32 is provided in the multiway valve 36 according to the present invention, and this auxiliary valve connection 32 opens or closes in a temperature-dependent manner, it now becomes possible to integrate in the system an additional safety function, which can prevent overheating in case of a defect in the area of the multiway valve 36. It shall be pointed out here that this safety function is of great advantage not only in the operating state shown in FIG. 6, i.e., during the cold start phase. In case of a risk of overheating, it can also be ensured by releasing the auxiliary valve connection 32 that the cooling heat exchanger 44 is also included in the flow circulation in order to thus achieve the safety function in the state being shown in FIG. 7, in which heat is released only in the area of the heating heat exchanger 46.

It shall be pointed out, in general, that the auxiliary valve connection 32 could, of course, also lead, as an alternative or in addition, e.g., to the line 48. The consequence of this would be that a connection would be established in case of overheating between the auxiliary valve connection 32 and consequently the valve chamber 8 and this line 48 in the operating state being shown in FIG. 9, in which the heating heat exchanger 46 is basically not included in the circulation, so that the cooling medium could then flow back to the line 54 and consequently to the drive assembly 42 through the line 48 and the heating heat exchanger 46 and the line 50 after the release of more heat.

It is self-explanatory that it can be ensured by the dimensioning of the different flow cross sections in the lines and in the various valve connections that correspondingly defined flow distributions will also be achieved by providing defined flow resistances. It is, in principle, also conceivable to design the auxiliary valve member 28 such that it not only releases and closes the opening 30 during its movement, but will also interact with one of the main valve connections 3 through 6, e.g., the main valve connection 5, in order to close this at least partially, e.g., when the opening 30 is released.

Figure 11:
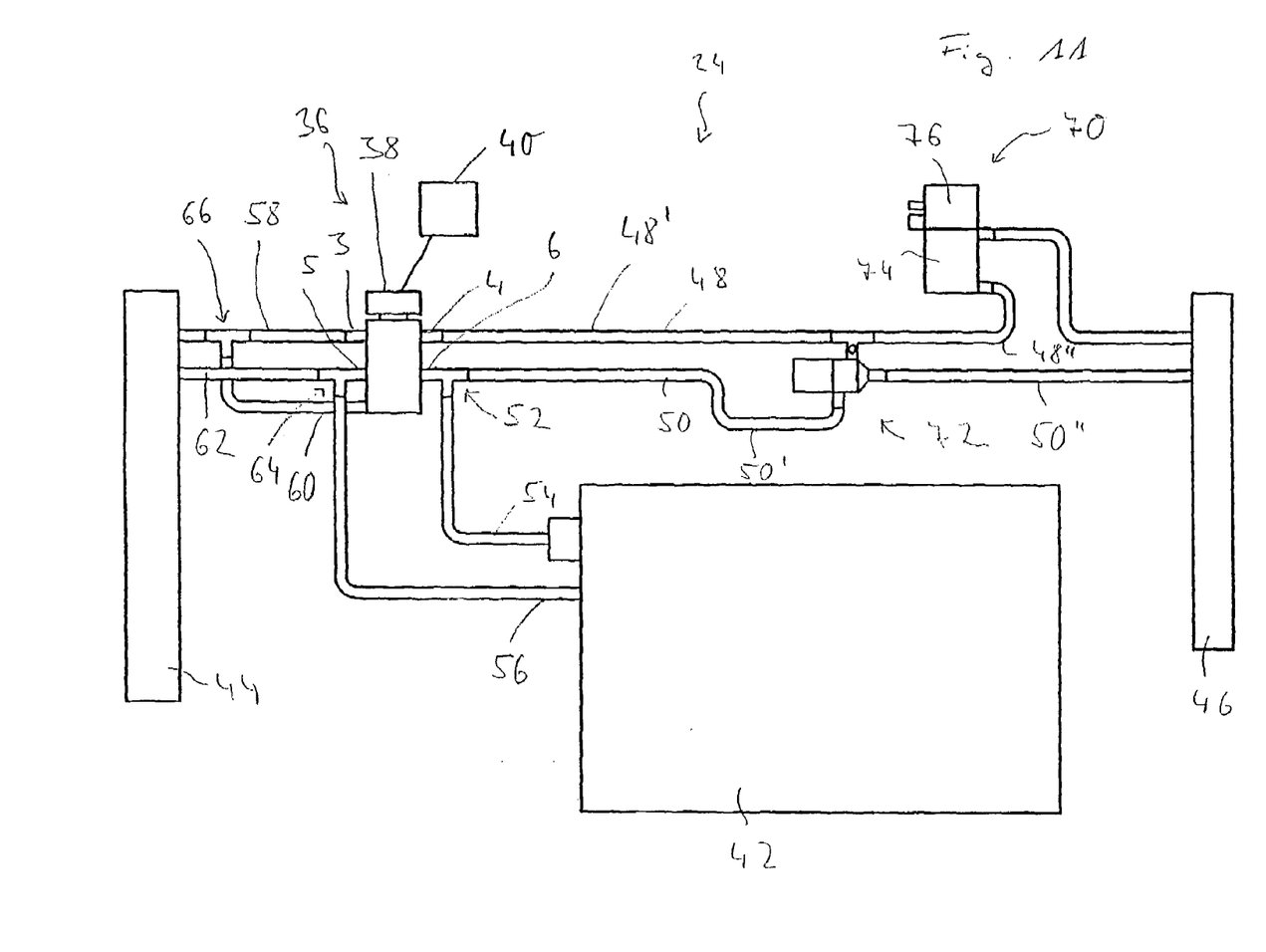

Another alternative embodiment of a heating/cooling system 24 according to the present invention is shown in FIG. 11. This system has, in principle, the same design as that described above in reference to FIGS. 6 through 10, but it additionally has a heater 70 acting as a parking heater or optionally also as an auxiliary heater with a multifunction pump 72. The heater 70 may be of the conventional design and comprise a heat exchanger arrangement 74, in which heat for heating purposes, which is generated in a burner area 76, can be transferred to the cooling medium, which is flowing in the line 48. The pump 72 may be designed such that it can additionally also assume the function of a valve that can be switched over as desired. The design is such that both the line 48 and the line 50 can be divided into two line sections 48' and 48" as well as 50' and 50". The line section 48' is located between the main valve connection 4 and the pump 72, whereas the line section 48" is located between the pump 72 and the heating heat exchanger 46 and also has a heater 70. The line section 50' is located between the main valve connection 6 and the pump 72, whereas the line section 50" is located between the pump 72 and the heating heat exchanger 46. By correspondingly actuating the pump 72 or a valve arrangement formed by same, it becomes possible to create an independent circulation circuit, which comprises the two line sections 48' and 50', the heater 70, the heating heat exchanger 46 and the pump 72. It is thus possible, independently from the rest of the system, to assume a parking heater function, in which the heat generated in the heater 70 can be transferred with high efficiency in the heating heat exchanger 46 to the air to be introduced into the interior space of the vehicle. It is, of course, possible synchronously with this operation to also continue to operate the rest of the system, e.g., in the operating state being shown in FIG. 6 or in FIG. 9, by correspondingly actuating the multiway valve 36. If the pump 72 is set differently, it can be connected or the flow path can be connected, e.g., coupled with the actuation of the multiway valve 36, such that the line sections 48' and 48" are in connection, as are the line sections 50' and 50", so that the heater 70 as well as the pump 72 are now included in the rest of the system due to the corresponding parallel actuation of the multiway valve 36 and they additionally contribute to the transfer of heat to the heating medium and consequently to heating the drive assembly 42 and the heating medium more rapidly, e.g., in the cold start mode during operation in the operating state shown in FIG. 8 or in the operating state shown in FIG. 7.

As was described above, it is also possible by positioning the multiway valve 36 in intermediate valve positions to provide for states in which not only two main valve connections but also a plurality of such connections communicate with one another. Thus, it is also possible, e.g., to assume an intermediate valve position that is located between the states b) and c) in FIGS. 1 through 4, for example, when cooling is additionally also necessary in case of increasing heating of the cooling medium in a state in which the multiway valve was at first in the valve position c) and the cooling medium is thus sent to the heating heat exchanger 46. The circulation path to the cooling heat exchanger 44 is connected by a slight adjustment from state c) in the direction of state b), and the essential circulation will now run via the heating heat exchanger, e.g., due to the fact that the intermediate valve position now being assumed is even closer to state c).

While a specific embodiment of the invention has been shown and described in detail to illustrate the application of the principles of the invention, it will be understood that the invention may be embodied otherwise without departing from such principles.

What is claimed is:

1. A multiway valve, comprising
a valve housing arrangement, in which a valve chamber is formed, with at least three main valve connections leading to said valve chamber;
a main valve member, which can be brought into a plurality of valve member positions to interrupt and release the connection between said main valve connections and said valve chamber as desired, wherein at least two of said main valve connections being in connection with said valve chamber in each valve member position of said main valve member;
at least one auxiliary valve connection leading to said valve chamber; and
an auxiliary valve member, which is associated with said auxiliary valve connection and can be adjusted for interrupting and releasing the connection between said auxiliary valve connection and said valve chamber, wherein said auxiliary valve member being adjustable between an interruption position and a release position depending on the temperature in an area of said valve chamber, and wherein the connection between at least one of said main valve connections and said valve chamber can be varied by adjusting said auxiliary valve member between the interruption position and the release position.

2. A multiway valve in accordance with claim 1, wherein said auxiliary valve member has a adjusting element, which adjusts said auxiliary valve member between the interruption position and the release position due to a thermally induced change in its dimensions.

3. A multiway valve in accordance with claim 2, wherein said adjusting member adjusts said auxiliary valve member in the direction of the release position against the action of a force pretensioning it in the direction of the interruption position.

4. A multiway valve in accordance with claim 1, wherein four said main valve connections are provided.

5. A vehicle cooling/heating system, comprising:
multiway valve with a valve housing arrangement, in which a valve chamber is formed, with at least three main valve connections leading to said valve chamber, a main valve member, which can be brought into a plurality of valve member positions to interrupt and release the connection between said main valve connections and said valve chamber as desired, wherein at least two of said main valve connections being in connection with said valve chamber in each valve member position of said main valve member, at least one auxiliary valve connection leading to said valve chamber and an auxiliary valve member, which is associated with said auxiliary valve connection and can be adjusted for interrupting and releasing the connection between said auxiliary valve connection and said valve chamber
a first fluid line providing a connection between a first main valve connection and a first heat exchanger arrangement;
a second fluid line providing a connection between a second main valve connection and said first heat exchanger arrangement;
a third fluid line providing a connection between a third main valve connection and a second heat exchanger arrangement;
a fourth fluid line providing a connection between a fourth main valve connection and said second heat exchanger arrangement;
a fifth fluid line providing a connection between said first main valve connection or said second main valve connection and a drive assembly;
a sixth fluid line providing a connection between said third main valve connection or said fourth main valve connection and said drive assembly; and
a seventh fluid line, which provides for a connection between said auxiliary valve connection and a fluid line from said first fluid line, said second fluid line, said third fluid line and said fourth fluid line.

6. A vehicle cooling/heating system in accordance with claim 5, wherein independently from the valve member position of said main valve member, a fluid exchange connection is established between said drive assembly and one of said heat exchanger arrangements when the interruption of the connection between said auxiliary valve connection and said valve chamber is eliminated.

7. A vehicle cooling/heating system in accordance with claim 5, wherein said second heat exchanger arrangement comprises a vehicle heater heat exchanger; that a heater for heating a fluid flowing in said third fluid line or in said fourth fluid line is associated with said third fluid line or said fourth fluid line, and a valve arrangement is provided, by which said third fluid line and said fourth fluid line can be uncoupled at least in some sections from said third main valve connection and from said fourth main valve connection in order to generate a fluid circulation between said heat exchanger arrangement and said heater, or said third fluid line and said fourth fluid line can be released to connect said second heat exchanger arrangement to said third main valve connection and said fourth main valve connection.

* * * * *